(12) United States Patent
Kähler et al.

(10) Patent No.: US 7,100,940 B2
(45) Date of Patent: Sep. 5, 2006

(54) GAS BAG MODULE

(75) Inventors: Karsten Kähler, Aschaffenburg (DE); Ralf Scherer, Aschaffenburg (DE); Michael Schneider, Sulzbach (DE); Dominik Schütz, Waldaschaff (DE)

(73) Assignee: TRW Automative Safety Sytems GmbH, Aschaffenburg (DE)

( * ) Notice: Subject to any disclaimer, the term of this patent is extended or adjusted under 35 U.S.C. 154(b) by 260 days.

(21) Appl. No.: 10/760,435

(22) Filed: Jan. 20, 2004

(65) Prior Publication Data

US 2004/0169354 A1 Sep. 2, 2004

(30) Foreign Application Priority Data

Feb. 28, 2003 (DE) .......................... 203 03 303 U

(51) Int. Cl.
*B60R 21/16* (2006.01)
(52) U.S. Cl. .................................. 280/728.2; 280/731
(58) Field of Classification Search ............ 280/728.2, 280/728.1, 731, 732
See application file for complete search history.

(56) References Cited

U.S. PATENT DOCUMENTS

| | | | |
|---|---|---|---|
| 5,678,850 A * | 10/1997 | Ricks et al. | 280/728.2 |
| 6,029,992 A * | 2/2000 | Vendely et al. | 280/728.2 |
| 6,517,099 B1 * | 2/2003 | Igawa et al. | 280/728.2 |
| 6,565,113 B1 * | 5/2003 | Kassman et al. | 280/728.2 |
| 6,682,092 B1 * | 1/2004 | Schutz et al. | 280/731 |
| 6,695,343 B1 * | 2/2004 | Christiansen et al. | 280/731 |
| 6,752,415 B1 * | 6/2004 | Nelson et al. | 280/728.2 |
| 6,899,352 B1 * | 5/2005 | Yamamoto et al. | 280/743.2 |
| 2002/0109337 A1 | 8/2002 | Kassman et al. | |
| 2005/0236820 A1 * | 10/2005 | Amamori | 280/731 |
| 2005/0248135 A1 * | 11/2005 | Poli et al. | 280/731 |

FOREIGN PATENT DOCUMENTS

| | | |
|---|---|---|
| DE | 29621295 | 3/1997 |
| JP | 10086781 | 4/1998 |

\* cited by examiner

*Primary Examiner*—David R. Dunn
*Assistant Examiner*—Toan C. To
(74) *Attorney, Agent, or Firm*—Tarolli, Sundheim, Covell & Tummino LLP

(57) ABSTRACT

A gas bag module comprising a gas generator (16) and a module housing (14). The gas generator (16) has a generator flange (22), which is provided with first hook-shaped fastening elements (24) of sheet metal for fastening the gas bag module (12) to a steering wheel (10). The generator flange further has second fastening elements (30; 30'; 30") for fastening the gas generator (16) to the module housing (14).

9 Claims, 2 Drawing Sheets

GAS BAG MODULE

TECHNICAL FIELD

The invention relates to a gas bag module with a gas generator and a module housing.

BACKGROUND OF THE INVENTION

Driver's gas bag modules have been part of the standard equipment of modern vehicles for some years. Economic considerations require that the gas bag module can be mounted and fastened to the vehicle in as few process steps as possible. In the fastening of gas bag modules in steering wheels, therefore, screw couplings are being increasingly replaced by the use of detent connections, for reasons of cost and time. These must, at the same time, be able to be closed quickly and simply and ensure a secure connection.

It is an object of the invention to improve an above-mentioned gas bag module with regard to its installation and fastening to the steering wheel.

BRIEF SUMMARY OF THE INVENTION

According to the invention, a gas bag module comprising a gas generator and a module housing. The gas generator has a generator flange, which is provided with first hook-shaped fastening elements of sheet metal for fastening the gas bag module to a steering wheel. The generator flange further has second fastening elements for fastening the gas generator to the module housing. This construction allows the gas bag module to be fastened via the gas generator on the steering wheel e.g. by means of a detent connection, whilst at the same time the gas generator can be fixed to the module housing with little effort. The generator flange, which is usually a sheet metal ring surrounding the gas generator radially, is constructed in accordance with the invention such that further components for fastening the gas generator to the module housing and also for fastening the module to the steering wheel can be dispensed with. The fastening of the module to the steering wheel via the gas generator also has the advantage that the high forces occurring on igniting of the gas generator can be transferred directly to components fixed to the steering wheel. Through the reduction of the number of components, the manufacturing time and manufacturing costs are reduced.

Preferably, the first and second fastening elements are punched out or cut out from sheet metal. The production of the generator flange can therefore take place such that the first and second fastening elements are already manufactured in one piece with the sheet metal flange. For this, the generator flange and also the fastening elements are punched out or cut out from the initially flat sheet metal and are only later bent or deformed into their final position and shape.

In a preferred embodiment of the invention, the second fastening elements are formed on the first fastening elements. The first and second fastening elements can of course also be constructed spatially separate from each other on the generator flange.

The second fastening elements can each be formed, for example, by a recess in the first fastening elements. This construction is suitable for connecting the second fastening elements with the module housing by a wedge/clamping connection. Thus, a secure and easily re-releasable connection of the gas generator with the module housing can be realized.

According to another preferred embodiment of the invention, the second fastening elements are constructed as sheet metal sections and connected with the module housing by crimping. For this, the sections constructed on the generator flange are, for example, bent around the edge of an opening of the module housing and fastened thereto by crimping.

An embodiment of the invention makes provision that the second fastening elements are connected with the module housing by means of at least one safety clip. In this case, the sections of the first fastening elements situated closer to the generator serve as second fastening elements, on which the safety clip engages and thus fixes the gas generator on the module housing. Here, too, the second fastening elements can be constructed alternatively as components which are separate from the first fastening elements.

According to a further preferred embodiment, the second fastening elements are connected with the module housing by a press fit. For this, for example a section of the generator flange completely surrounding the gas generator peripherally can serve as second fastening element.

The generator flange can fulfill a further function in that an inflation opening of a gas bag arranged in the module housing is fastened to the module housing by the generator flange, which permits a saving of an additional gas bag holding element. The gas bag is clamped here in a conventional manner between the generator flange, which serves as gas bag holding element, and the module housing, openings being able to be provided in the gas bag which surround the inflation opening, through which the first and/or second fastening elements extend, in order to additionally fix the gas bag.

It is an aim of the invention to fasten the gas bag module to the steering wheel or, in general terms, to a vehicle, via the generator flange, whilst at the same time the generator is connected with the module housing via the generator flange. The module housing can be constructed here as a dish which receives the gas generator and the gas bag; however, this can also for example be a plate-shaped gas generator carrier or another component.

DETAILED DESCRIPTION OF THE PREFERRED EMBODIMENTS

Figure 1A:
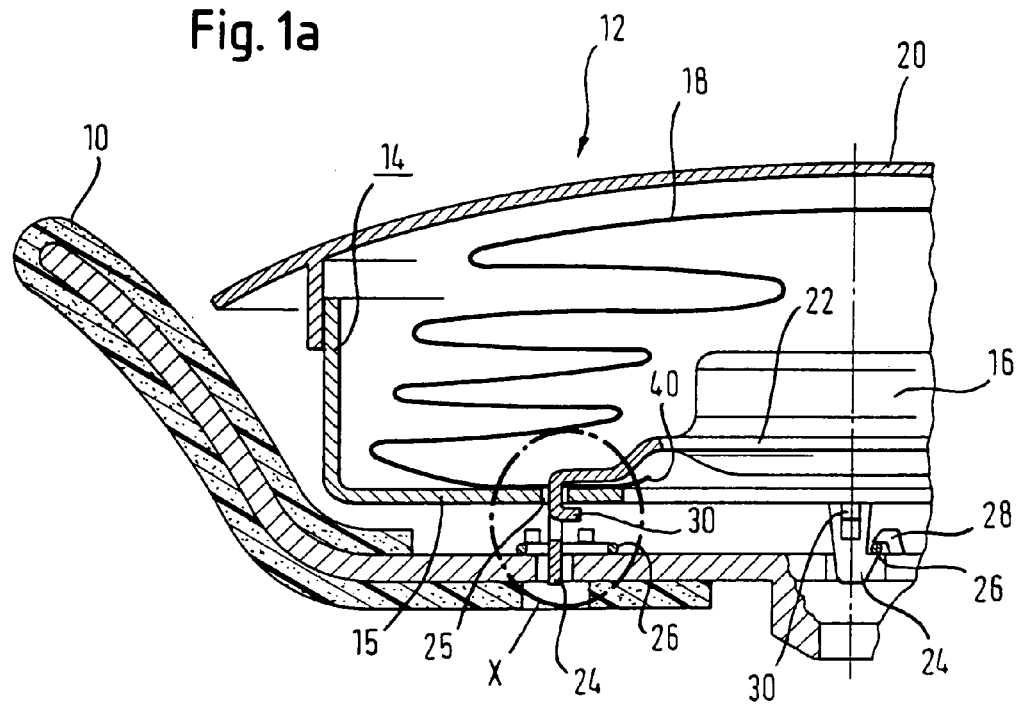
FIG. 1a shows a view, partially in section, of a gas bag module according to the invention in accordance with a first embodiment.
Figure 1B:
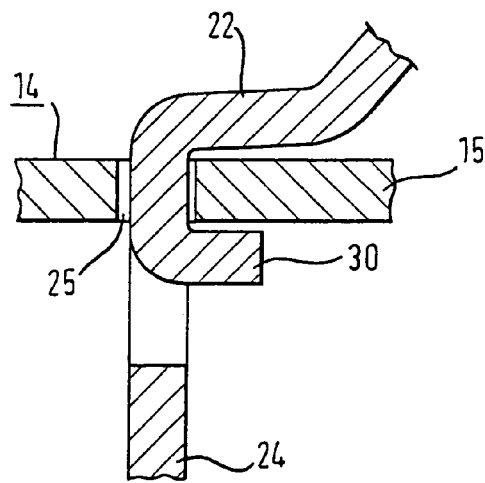
FIG. 1b shows an enlarged view of the detail designated by "X" of the gas bag module of FIG. 1.

In FIGS. 1a and 1b there is shown a steering wheel 10 with a gas bag module 12, the gas bag module 12 being inserted in the hub region of the steering wheel 10 and fixed thereto.

The gas bag module 12 has a cup-shaped module housing 14 with a base 15, a gas generator 16 and a folded gas bag 18 arranged in the module housing 14. The module housing 14 is closed in a known manner by a covering 20. Here, a dish-shaped module housing 14 is shown, in which the gas bag 18 is held. The invention is, however, also readily able to be transferred to other forms of the module housing, such as for example flat generator carriers.

The gas generator 16 in the case shown here is a cylindrical, cup-shaped gas generator which is surrounded peripherally by a radially projecting generator flange 22 consisting of a metal sheet.

On the generator flange 22, strip-shaped lateral extensions are bent axially in the direction towards the base 15. These have hook-shaped first fastening elements 24, which extend through openings 25 in the base 15 of the module housing 14 and engage into an arresting means 26, connected securely with the steering wheel but movable by a certain play, in order to fix the gas bag module 12 to the steering wheel 10. In the embodiment illustrated here, the arresting means 26 is held by hooks 28 constructed so as to be integral with the steering wheel. Of course, embodiments are also conceivable in which the hook-shaped first fastening elements 24 engage directly into complementary detent elements on the steering wheel 10. Several of these first fastening elements 24 are provided, preferably three to five, which surround the gas generator 16 peripherally. The hooks of the first fastening elements 24 can either point in the same or in different directions.

In the examples shown here, the gas bag module 12 is constructed as a so-called floating horn module.

The generator flange 22 has, in addition to the first fastening elements 24, several second fastening elements 30. In the embodiment illustrated in FIG. 1a, these are constructed as tongues cut free from the arms of the first fastening elements 24, which are bent over in the direction towards the gas generator 16 and on the edge of the openings 25 embrace the base of the module housing 14. The second fastening elements 30 are securely fastened to the module housing 14 in this case by crimping. The bent-over sections of the second fastening elements 30 lie after their fastening on the module housing 14 on the side of the module housing 14 directed towards the steering wheel 10.

It is also conceivable to arrange the second fastening elements 30 at a different site on the periphery of the generator flange 22 than the first fastening elements 24.

Figure 2:
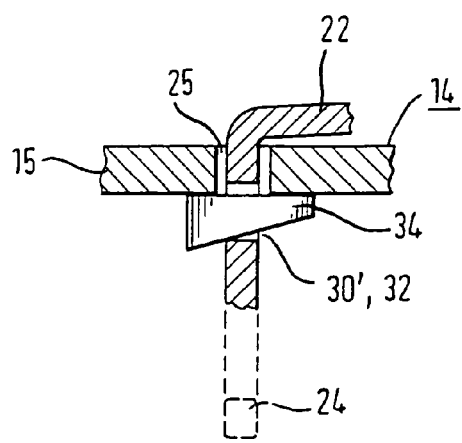
FIG. 2 shows the detail designated by "X" of the gas bag module of FIG. 1 in accordance with a second embodiment of the invention.

FIG. 2 illustrates a further embodiment. Here, the second fastening elements 30' are formed through recesses 32 in the arms of the first fastening elements 24. The gas generator 16 is fastened to the module housing 14 by a wedge/clamping connection with one or more components 34 having a wedge-shaped section. As indicated in FIG. 2, the recess 32 is constructed in the arm of one of the fastening elements 24; however, it is also possible to provide the second fastening elements 30' at a site separated spatially from the first fastening elements 24.

Figure 3:
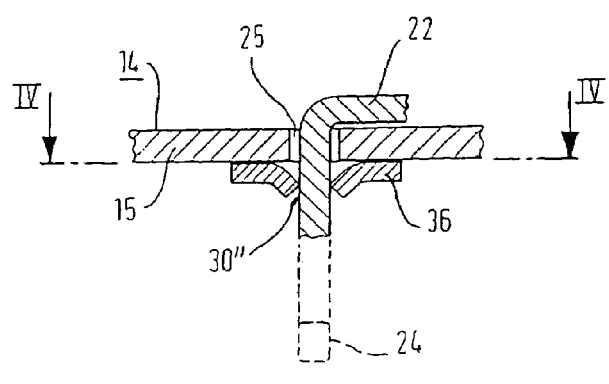
FIG. 3 shows the detail designated by "X" of the gas bag module of FIG. 1 in accordance with a third embodiment of the invention.
Figure 4:
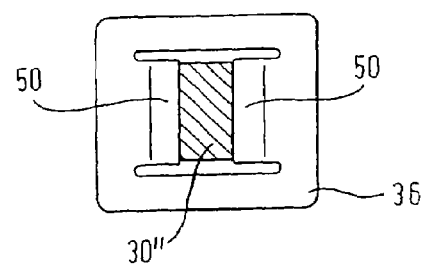
FIG. 4 shows a section through the fastening elements along the line IV—IV in FIG. 3.

In the embodiment shown in FIGS. 3 and 4, the second fastening elements 30" are formed by upper sections of the first fastening elements 24. These are fixed on the underside of the module housing 14 by one or more correspondingly shaped, punched safety clips 36, which prevent a movement of the gas generator away from the steering wheel 10. The safety clip has two shaped, sharp-edged tongues 50, the edges of which press against the side faces of the fastening element 30".

The generator flange 22 also serves at the same time as a gas bag holding element. The edge 40 of an inflation opening of the gas bag 18 is clamped between the generator flange 22 and the base of the module housing 14. The gas bag 18 can, for example, have openings corresponding to the openings 25 of the module housing 14, through which the first and/or second fastening elements 24, 30 engage. Also, the embodiments shown in FIGS. 2 and 3 can have a generator flange 22 constructed in such a way.

Figure 5:
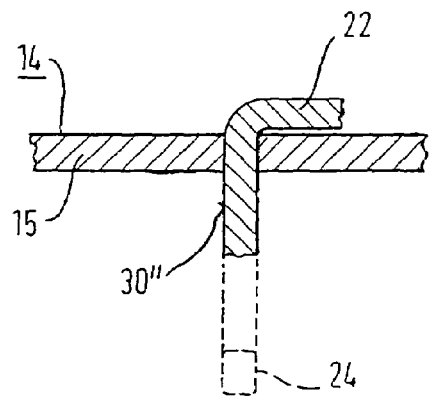
FIG. 5 shows a section taken through the fastening element and a base of the module housing according to a further embodiment.

In the embodiment of the invention shown in FIG. 5, the second fastening element 30" is constructed as a section of the generator flange, which is connected by means of a press fit with the base 15 of the module housing 14, preferably with an edge of an opening into which the gas generator is inserted.

In another possible embodiment of the invention, the first or second fastening elements are not connected in one piece with the generator flange, but rather are constructed as separate components and securely connected with the generator flange by gluing or welding. The generator flange in turn may be constructed in one piece with the gas generator or may be a separate component firmly connected therewith.

The invention claimed is:

1. A gas bag module comprising a gas generator (16) and a module housing (14),
    said gas generator (16) having a generator flange (22), which is provided with first hook-shaped fastening elements (24) of sheet metal for fastening said gas bag module (12) to a steering wheel (10),
    and second fastening elements (30; 30'; 30") for fastening said gas generator (16) to said module housing (14), said second fastening elements (30; 30'; 30") being formed on said first fastening elements (24).

2. The gas bag module according to claim 1, wherein said first and second fastening elements (24; 30; 30'; 30") are punched out or cut out from sheet metal.

3. The gas bag module according to claim 1, wherein said second fastening elements (30') are each formed by a recess (32) in said first fastening elements (24).

4. The gas bag module according to claim 1, wherein said second fastening elements (30) are constructed as sheet metal sections and are connected with said module housing (14) by crimping.

5. The gas bag module according to claim 1, wherein said second fastening elements (30") are connected with said module housing (14) by means of at least one safety clip (36).

6. The gas bag module according to claim 1, wherein said second fastening elements are connected with said module housing by a press fit.

7. The gas bag module according to claim 1, wherein an inflation opening of a gas bag (18) arranged in said module housing (14) is fastened to said module housing (14) by said generator flange (22).

8. The gas bag module according to claim 1, wherein said fastening elements (24, 30, 30', 30") are provided on strip-shaped lateral extensions of said generator flange, said extensions being bent over axially in a direction towards a base (15) of said module housing. direction towards a base (15) of said module housing.

9. A gas bag module comprising a gas generator (16) and a module housing (14),
    said gas generator (16) having a generator flange (22), which is provided with first hook-shaped fastening elements (24) of sheet metal for fastening said gas bag module (12) to a steering wheel (10),
    and second fastening elements (30; 30'; 30") for fastening said gas generator (16) to said module housing (14), said second fastening elements (30') being connected with said module housing (14) by a wedge/clamping connection (32, 34) with at least one component (34) having a wedge-shaped section.

* * * * *